(12) United States Patent
Riordan

(10) Patent No.: US 7,134,018 B2
(45) Date of Patent: Nov. 7, 2006

(54) ACCESS CONTROL FOR COMPUTERS

(76) Inventor: James Riordan, Isengrundstrasse 10, CH-8134 Adliswil (CH)

( * ) Notice: Subject to any disclaimer, the term of this patent is extended or adjusted under 35 U.S.C. 154(b) by 364 days.

(21) Appl. No.: 09/808,341

(22) Filed: Mar. 14, 2001

(65) Prior Publication Data

US 2002/0066016 A1  May 30, 2002

(30) Foreign Application Priority Data

Mar. 15, 2000 (EP) ................................. 00105529

(51) Int. Cl.
*H04L 9/00* (2006.01)

(52) U.S. Cl. .................. 713/170; 713/176; 713/187; 713/188; 726/22; 726/23; 726/24

(58) Field of Classification Search ................ 713/181, 713/170, 176, 187, 188, 200–202
See application file for complete search history.

(56) References Cited

U.S. PATENT DOCUMENTS

| | | | | |
|---|---|---|---|---|
| 5,343,527 A | * | 8/1994 | Moore | ......................... 713/179 |
| 5,657,390 A | * | 8/1997 | Elgamal et al. | ............. 713/151 |
| 5,841,978 A | * | 11/1998 | Rhoads | ........................ 709/217 |
| 5,872,844 A | * | 2/1999 | Yacobi | ......................... 705/69 |
| 5,915,019 A | * | 6/1999 | Ginter et al. | .................. 705/54 |
| 6,023,764 A | | 2/2000 | Curtis | |
| 6,748,538 B1 | * | 6/2004 | Chan et al. | .................. 713/200 |

FOREIGN PATENT DOCUMENTS

| | | |
|---|---|---|
| CH | 11-024917 | 1/1999 |
| EP | 0 862 105 A2 | 9/1998 |
| WO | WO 99/44133 | 9/1999 |

\* cited by examiner

*Primary Examiner*—Kambiz Zand

(57) ABSTRACT

The invention provides a general and flexible mechanism for a secure access control on a computer. Cryptographic checksums are applied for the identification of a program to another program. These cryptographic checksums are generated automatically for the programs. Each program has its program-specific identifier which can be regarded as a substantially unique value or name. Such a program-specific identifier can be used to verify the validity of one program to another program. Mutual trust relationships between different programs can therewith be set up easily.

12 Claims, 4 Drawing Sheets

ACCESS CONTROL FOR COMPUTERS

TECHNICAL FIELD

The present invention relates to secure and trusted processing of programs and applications on a computer. More particularly, the invention is related to a mechanism for the identification of a program to another program.

BACKGROUND OF THE INVENTION

Traditional computer and computer systems, particularly connected systems within a defined network, are managed by systems administrators. The currently used access control mechanisms have focused on separating the users from one another based upon a security policy determined by the systems administrators. Some, primarily military, systems have allowed finer-grained access control policies allowing separation of different aspects of an individual user but the complexity of these systems made them prohibitively expensive to administer. As a result, these system access control mechanisms have not been widely adopted.

The access control schemes available in various databases and in Java offer finer-grained control of data and objects but do now solve the general problem of access control at the system level.

Most personal computers (PC) can not solve sufficiently the problem of security. PC operating systems, including DOS, Windows, and MacOS, have been assaulted by a barrage of viruses, Trojan horses, and other malicious software, also referred to as malware. The release and use of such malware has been essentially a form of vandalism and its danger grows with the use of the Internet.

If one use such systems for economically meaningful transactions, there is far greater benefit and hence incentive for an attacker. Thus, the need for security is essential, whereby a call arises for an appropriate access control mechanism.

The form factor and usage characteristics of hand held devises, such as personal digital assistants, also abbreviated as PDAs, makes them extremely desirable for use in many e-commerce applications. Unfortunately, current PDA operating systems do not offer the needed security for e-commerce applications. The very fact that PDAs are powerful and general purpose computing devices renders them vulnerable to attack. E-commerce systems based upon PDAs are potentially vulnerable to an entire range of attacks which also can endanger other included systems, e.g. smartcards.

Commonly, a system administrator must determine how much trust can be given to a particular program and/or user. This determination includes considering the value of the information resources on the system in deciding how much trust is required for a program to be installed with privilege. It is a drawback that the system administrator has to update the system and the privileges continuously.

U.S. Pat. No. 3,996,449 is related to an operating system authenticator for determining if an operating system being loaded in a computer is valid. A user's identification code or secret key which is unique to the operating system, and a verifier value which is a predetermined function of a valid operating system and the identification code are respectively stored. A hash function, which is a function of the operating system being loaded and the identification code, is generated by the authenticator. After the operating system is loaded, the hash function is used as an authenticating value and compared with the verifier value for determining the authenticity of the loaded operating system.

In U.S. Pat. No. 5,113,442 a method, and an operating system utilizing this method, for controlling access rights among a plurality of users is described. Each user is provided a user identification number which is prime and each secure object is provided an access code which comprises a value that is a product of the user identification numbers of all users having the same access rights to that secure object. In response to a request by a user for access to a secure object, the access code for that secure object is divided by the user identification number of the requesting user.

Access rights of the user to the requested secure object are determined based on whether the result of the division yields a zero remainder.

Glossary

The following are informal definitions to aid in the understanding of the following description.

Hash function is a computationally efficient function mapping binary strings of arbitrary length to binary strings of some fixed length.

One-way hash function is a function which takes a variable-length message M or some data and produces a fixed-length value, also referred to as hash or specific identifier. Given the specific identifier, it is computationally infeasible to find a message with that specific identifier; in fact one can't determine any usable information about the message M with that specific identifier. In other words, the time to create such a specific identifier is substantially shorter than the time to reconstruct the variable-length message out of the specific identifier. Moreover, the time to find two identical specific identifiers is substantially longer than the time to create one specific identifier.

Trusted computing base (TCB) indicates the totality of protection mechanisms within a computer system, including hardware, firmware, and software, the combination of which is responsible for enforcing a security policy.

OBJECT OF THE INVENTION

It is an object of the present invention to overcome the disadvantages of the prior art.

It is another object of the present invention to provide a mechanism for a secure access control of programs on a computer or on distributed systems.

It is still another object of the present invention to provide an access control mechanism which not requires any system administrator.

It is a further object of the present invention to present an access control mechanism which is unspoofable and therefore works in a secure manner.

It is yet another object of the present invention to provide a method and an apparatus for verifying the identity of a program on a computer to another program on the same or different computer.

SUMMARY AND ADVANTAGES OF THE INVENTION

The objects of the invention are achieved by the features stated in the enclosed independent claims. Further advantageous implementations and embodiments of the invention are set forth in the respective subclaims.

The invention provides a general and flexible mechanism for a secure access control on a computer or on distributed computers. When referring to a computer, any kind of computer is meant that has a trusted computing base, also abbreviated as TCB. Such a computer can be a member of a network and can support multiple secure domains or applications.

The basic idea of the invention is that a computer uses cryptographic functions, i.e. cryptographic checksums, also referred to as one-way-hash functions, to automatically generate program-specific cryptographic identifiers or short program-specific identifiers and form therewith the basis of an access control mechanism. These program-specific identifiers can be regarded as names for the programs and are obtained by applying a hash function to the programs. The output, the program-specific identifier, also called hash value, is a substantially unique value for a specific program that might be stored, cached, or derived on-the-fly. In general, the names are provided by the trusted computing base or in more detail by an operating system. The cryptographic function fulfills at least the following criteria. The time to create such a specific identifier is substantially shorter than the time to reconstruct the program or part thereof out of the specific identifier. Moreover, the time to find two identical specific identifiers is substantially longer than the time to create one specific identifier.

The mechanism runs as follows. A message-originator program sends a message including its derived name to a message-receiver program. The name is provided by the operating system and might be added to the message during sending or transferring. After receiving the message, the name is verified whether it is known to the message-receiver program and/or the trusted computing base. By doing so, the message that may include a special request can be accepted or rejected depending on the verification. For a response to the message, the message-receiver program converts to a so-called response-message-originator program, i.e. the message-receiver program becomes a message-originator program, and sends a message-response with its specific name.

Under a program is understood any kind of code or software which is able to run on a computer, such as application programs, Java-based programs, or virtual machines.

The present mechanism shows several advantages, such as it is not spoofable and is easily implemented. The work of a system administrator becomes redundant, since the names are created automatically by the trusted computing base. In general, the trustworthiness of computers can be increased dramatically and make them to safe and reliable devices, since several domains or applications can run one the same computer without being attackable by insecure programs.

By using the mechanism, uncontrolled and potentially insecure programs, such as suspected and attacking programs, cannot take control over the computer or interfere sensitive programs and applications.

On the one hand, if a program-specific identifier, i.e. a program-specific name, is known to the message-receiver program and a response-message is sent comprising an acceptation or acknowledgment and a response-program-specific identifier that, on the other hand, is known to the message-originator program, then the advantage occurs that both programs can trust each other, whereby the message-receiver program is then willing to inter-operate with the message-originator program. A trusted communication between both program can be set up easily.

Such a mentioned program-specific identifier is derivable by applying a first hash function to the message-originator program and a response-program-specific identifier is derivable by applying a second hash function to the message-receiver program. This proves advantageous because, in general, various hash functions can be applied to create a program-specific identifier and thus the mechanism is not restricted to a special type of hash function. The only assumption is that the program-specific identifier should be known to the message-receiver program in order to set up communication.

Nevertheless, the applied hash functions can be also identical, whereby a one-way-hash function, such as MD5 or SHA-1 is applicable. Such hash function are well known, work reliable, and can be processed, i.e. applied to a program in the millisecond time scale, without any remarkable effect to the user or the computing time in general.

A hash-function generator should be implemented into the trusted computing base, such that the program-specific identifiers are derived and provided by this trusted computing base automatically. Based on the underlying security policy, the trusted computing base cannot be circumvented or undermined by an attacker.

It is advantageous if the program-specific identifier and/or the message is signed by use of a private cryptographic key. By doing so, mutual trust between different programs can be established and set up easily. Moreover, arbitrarily trust relationships can be created, whereby it is particularly advantageous that the user has nothing to configure.

It is also advantageous if an additional program-specific identifier which is signed by the private cryptographic key is sent within the message, because the message-receiver program becomes securely manageable by developers whereby additional trusted programs can be installed and therewith trusted domains or applications can be set up easily. In other words, different programs which come from the same developer trust each other and can create mutual trust relationships.

The message-receiver program and/or the trusted computing base might have a public cryptographic key with which the response can be singed. This implies that if the message-originator program, that means the requesting program, has been written correctly, the message-receiver program and/or the trusted computing base will generate signatures only for documents that have been authorized by the user.

If program-specific identifiers are pre-stored in a list or a database, than a fast access to this identifiers and therefore a fast verification can be provided. It shows also advantageous if trusted program-specific identifiers are delivered or installed within the trusted computing base or when the computer is initialized for the very first time.

In the case that the program-specific identifier is not known to the message-receiver program and/or the trusted computing base, the message or request is rejected, for example be returning a zero to the message-originator program. This implies that the message-originator program is not a trusted one and might be suspect or even dangerous. For such programs a special domain can be created. But again, the positive point is that such programs can not interfere others, that means, for example, trusted programs, relevant documents, or private records on the computer.

DESCRIPTION OF THE DRAWINGS

The invention is described in detail below with reference to the accompanying schematic drawings, wherein.

Figure 1:
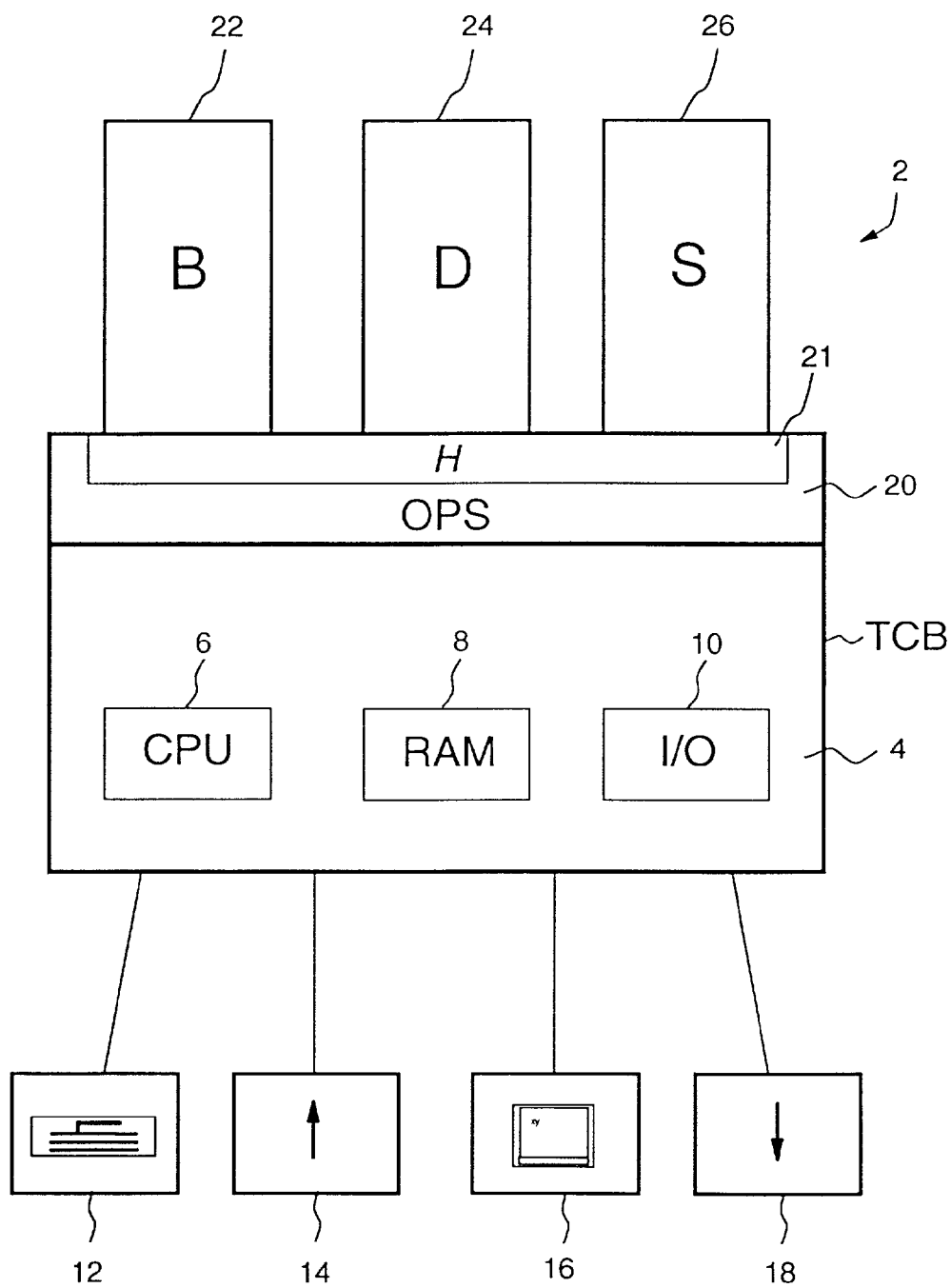
FIG. 1 shows a block diagram of a computer system.

All the figures are for the sake of clarity not shown in real dimensions, nor are the relations between the dimensions shown in a realistic scale.

DESCRIPTION OF PREFERRED EMBODIMENTS

With general reference to the figures and with special reference to FIG. 1 the essential features of an access control mechanism for computers using cryptographic functions is described in more detail below. At first, some general points are addressed.

Hash Function

A hash function is a computationally efficient function mapping binary strings of arbitrary length to binary strings of some fixed length.

One-way Hash Function

A one-way hash function is a function which takes a variable-length message and produces a fixed-length hash or value. Thus: h=H(M), with H the one-way hash function, M the message and h the hash value for message M. Given the hash h it is computationally infeasible to find a message M with that hash; in fact one can't determine any usable information about a message M with that hash. For some one-way hash functions it is also computationally infeasible to determine two messages which produce the same hash. Moreover, a one-way hash function can be private or public, just like an encryption function. MD5, SHA-1, and Snefru are examples of public one-way hash functions.

If such a one-way hash function is applied to a program E, which can be any program, than the output, the hash value h, is a substantially unique value, also referred to as program-specific identifier. This program-specific identifier can also be seen as a name that is given to the specific program E. In other words, the program E, that can be viewed as a byte stream $E=\{b_0, b_1, b_2, \ldots\}$, can be associated with its substantially unique name H(E). When the program E is run, it run with the label H(E). Persistent data created by the program E is accessible only to the program E and also bears the name H(E).

Using for example the above mentioned one-way hash function SHA-1, the probability to find two identical program-specific identifiers is approximately 1 to $2^{80}$, and the probability to find to a given program another program with the same program-specific identifier is approximately 1 to $2^{160}$.

Trusted Computing Base (TCB)

Under trusted computing base, also abbreviated as TCB, is understood the totality of protection mechanisms within a computer system, including hardware, firmware, and software, the combination of which is responsible for enforcing a security policy. An operating system being part of the trusted computing base. The security policy requests that the trusted computing base cannot be circumvented or undermined. i.e. it is secure against attacks.

The present access control mechanism can be used in general in computers and computer systems. When referring to a computer, any kind of device is meant that can be a member of a local network. Examples of devices are: laptop computers, workpads, nodepads, personal digital assistants (PDAs), notebook computers and other wearable computers, desktop computers, computer terminals, networked computers, internet terminals and other computing systems, set-top boxes, cash registers, bar code scanners, point of sales terminals, kiosk systems, cellular phones, pagers, wrist watches, digital watches, badges, smartcards, and other handheld and embedded devices. Other devices considered include: headsets, Human Interface Device (HID) compliant peripherals, data and voice access points, cameras, printers, fax machines, keyboards, joysticks, kitchen appliances, tools, sensors such as smoke and/or fire detectors, and virtually any other digital device.

Other examples of wearable computers that can be used in connection with the present invention are, personal effects being equipped with computer-like hardware, such as a "smart wallet" computer, jewelry, or articles of clothing. In addition to a "smart wallet" computer, there are a number of other variations of the wearable computers. A "belt" computer is such a variation which allows the user to surf, dictate, and edit documents while they are moving around. Yet another example is a children's computer which is comparable to a personal digital assistant for grade-school children. The children's computer might hold assignments, perform calculations, and help kids manage their homework. It can interface with other children's computers to facilitate collaboration, and it can access a teacher's computer to download assignments or feedback. Any wearable or portable device, any office tool or equipment, home tool or equipment, system for use in vehicles, or systems for use in the public (vending machines, ticketing machines, automated teller machines, etc.) might be used in the context of the present invention.

In order to aid in the understanding of the present invention, FIG. 1 shows a high-level block diagram of a computer 2.

The computer 2 includes hardware components 4 such as one or more central processing units (CPU) 6, a random access memory (RAM) 8, and an input/output (I/O) interface 10. The computer 2 also includes an operating system 20. Various peripheral devices are connected to the computer 2, such as secondary storage devices 12 (such as a hard drive), input devices 14 (such as keyboard, mouse, touch screen, a microphone, or infrared- or RF receiver), display devices 16 (such as a monitor or an LCD display), and output devices 18 (such as printers, or infrared- or RF transmitter). Also a smartcard device could be coupled to the input/output devices 14, 18. A plurality of programs 22, 24, 26 are executed in the computer 2. The programs 22, 24, 26 may be executed sequentially in the computer 2, but preferably executed in parallel in the computer system 2.

The hardware components 4 and the operating system 20 form a trusted computing base TCB, which constitute the basis for a secure and trusted computing. Into the trusted computing base, a generator-module 21 for creating program-specific identifiers is implemented. This generator-module 21 is basically a cryptographic-function generator 21 that can be implemented in software as well as in hardware. Since the generation of a hash value by applying a hash function, preferably a one-way hash function as described above, is not time-consuming for a processor, the cryptographic-function generator 21 might be implemented in the operating system 20 itself. Any cryptographic-function might be suitable that outputs a substantially unique value.

The structure of the computer 2, as described with reference to FIG. 1, is to be seen as the underlying device, that can be used in the following embodiments.

Figure 2:
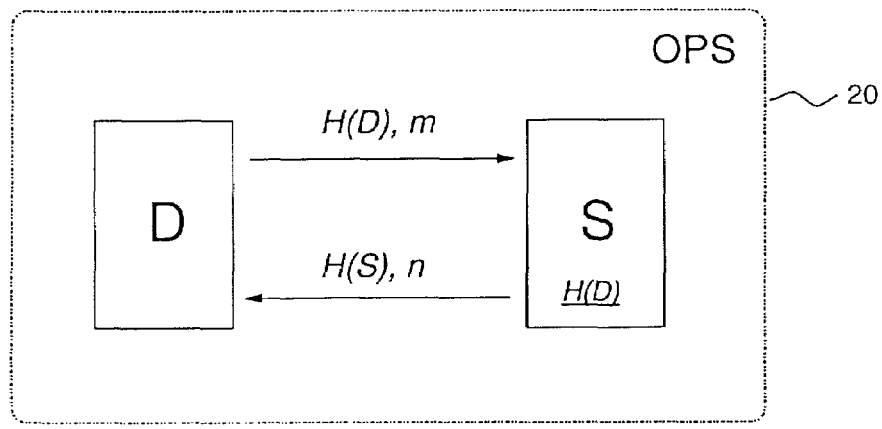
FIG. 2 shows a schematic illustration of an exchange of messages according to the present invention.

Still referring to FIG. 2, which shows a high-level schematic illustration of an exchange of messages. Some basics are explained in the following. A message-originator program D wants to communicate with another program, here a message-receiver program S. The message-receiver program S knows one or more program-specific identifiers. These identifiers could be pre-stored or cashed and might be also known to the operating system 20. At first, the message-originator program D sends a request m within a message to the message-receiver program S. Thereby, the generator-module 21 as part of the operating system 20 derives a program-specific identifier H(D) from the message-originator program D and adds this program-specific identifier H(D) to the message, as indicated by the arrow labeled with H(D), m.

In general, the operating system 20 adds to all requests sent by a message-originator program to a message-receiver program the respective program-specific identifier of the message-originator program which then can be verified or identified by the message-receiver program.

For simplification reasons, the generator-module 21 is not shown in FIG. 2. The program-specific identifier H(D) can also be pre-stored from the message-originator program D. After receiving the message including the program-specific identifier H(D) and the request m, the message-receiver program S tries to extract the program-specific identifier H(D) and verifies it with its known identifiers. If the program-specific identifier H(D), is known to the message-receiver program S, whereby this is here indicated by H(D) in box S, the message-receiver program S would accept further communication with the message-originator program D. For that, the message-receiver program S sends a response-message comprising a response n and its program-specific identifier H(S), also referred to as response-program-specific identifier H(S), to the message-originator program D, as indicated by the arrow from box S to box D. The response-program-specific identifier H(S) is thereby also provided by the operating system 20. Since the message-originator program D and the message-receiver program S can be executed on different computers or systems which are connectable via a network, each program D, S can have its trusted computing base that provides program specific identifiers. A connection to the network is provided by means known in the art, such as wire, infrared, RF, et cetera.

In the following, the various exemplary embodiments of the invention are described.

Figure 3:
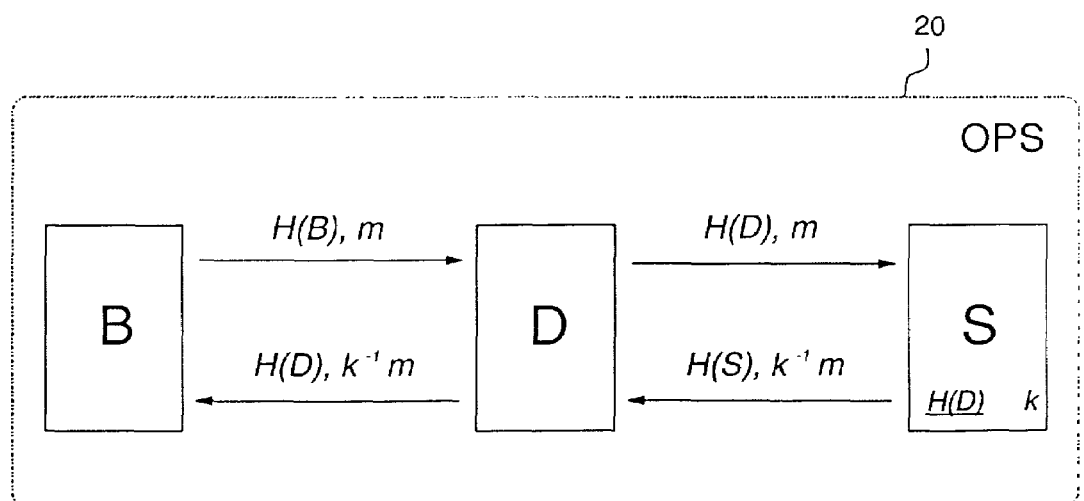
FIG. 3 shows a schematic illustration of a purchase scenario using a key.

FIG. 3 shows a schematic illustration of a purchase scenario using a key. Based on the trusted computing base and therewith on the operating system 20 run several programs or applications in compartments, that here is called browse B, display D and sign S. The underlying conception of this embodiment is that anyone should be able to ask for something. Since display D and sign S run in a secure compartment and thus are trustworthy whilst browse B is not, browse B or any other program can send a request to display D.

For example, when a signature is needed, a document is passed to the secure compartments display D and sign S for display, authorization, and signature generation. The security of the scheme is dependent only upon the sign S and display D compartment and its ability to display information to the user, and the sign compartment's ability to accept requests from display D. Only sign S needs access to a signing key k, as indicated in box S.

The display D compartment's ability to display data to a user has two primary assumptions: that the compartment can obtain a resource lock on the display D and that the data itself have a single well defined meaning. The ability to lock the display D is useful to diminish the threat of Trojan Horses. The granting of exclusive locks on system resources allows malicious code to either soft or hard lock the system thereby staging a denial of service attack. Assuming that all system locks can be forced to be soft locks, this threat is not interesting. It is thus the case that the primary issue is that the system should be able to lock a sufficient number of resources. These resources include the display, touch screen, various other I/O devices, memory pages, et cetera.

Sign S should be able to protect and manage its key k and to ensure that a request to sign a document came from browse B. Protecting and managing these data means that they should only be accessible to other compartments though sign's external interfaces. This implies certain low level properties of the system: the system should not allow raw access to memory, the integrity of messages (IPC) should be maintained, and access to system resources does not use the complete privileges.

By using the above described scheme of generating program-specific identifiers for each compartment, a naming system is provided so that there is a well defined difference between compartments.

It is assumed that a user wants to select and purchase an item. The item can be selected using browse B, that is a browser, as that of WAP (Wireless Applications Protocol), running on a PDA (personal digital assistant) that may bases on the computer as indicated with reference to FIG. 1. A browser is an extremely sophisticated piece of software that acts upon complex data supplied by untrusted users. It is possible, however, for the browser B to generate a request which is handed to display D and sign S for terms of payment authorization. For that, the browser B sends a request m to sign a document within a message to display D, whereby the operating system 20 attaches to the request m the program-specific identifier H(B) of browser B. This is indicated by the arrow labeled with H(B), m.

Display D, that is compared to browse B as small piece of software, forwards the request m with its program-specific identifier H(D), as indicated by the arrow labeled with H(D), m. The sign compartment, sign S, that might be a smartcard, verifies the received message with its known program-specific identifiers. When the program-specific identifier H(D) is known to sign S, whereby this is here indicated by H(D) in box S, the request m is accepted. Moreover, if display D has been written correctly, sign S generates signatures only for documents that have been authorized by the user.

A signature on the request m under the key k is denoted as $k^{-1}$. Sign S signs the request m and sends it together with its program-specific identifier to display D. This is indicated by the arrow labeled with H(S), $k^{-1}$ m. Further, display D passes the signed request with its program-specific identifier to browse B, as indicated by the arrow labeled with H(D), $k^{-1}$ m.

Figure 4A:
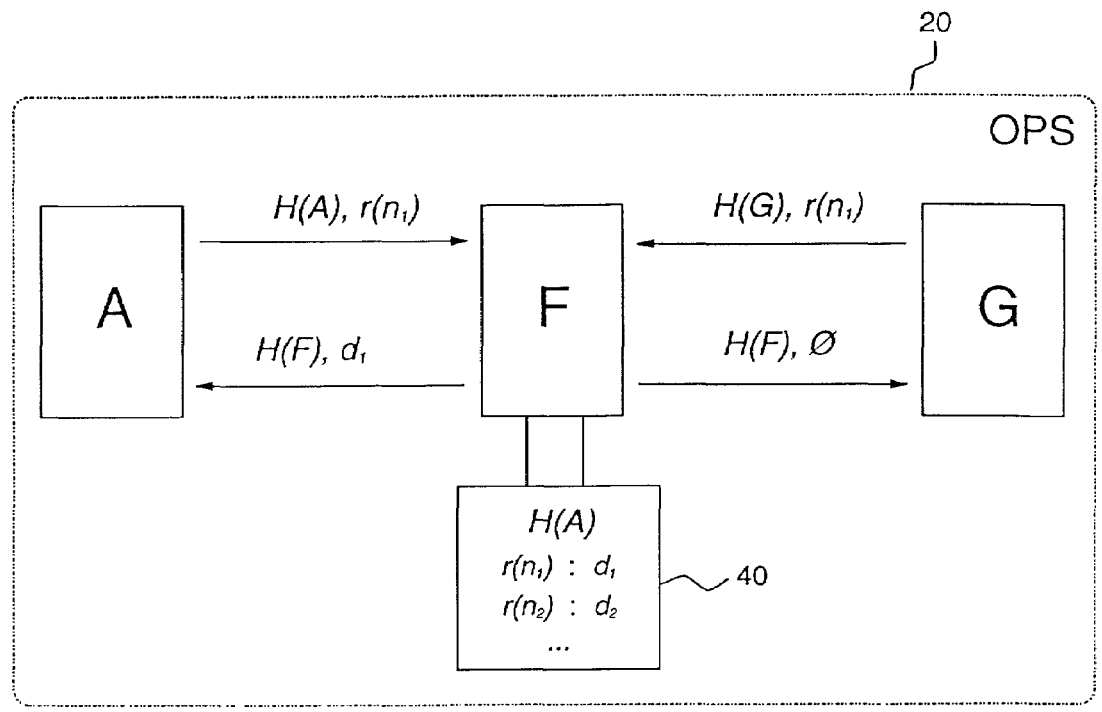
FIG. 4a shows a schematic illustration of a file system object with access control using a hash.

FIG. 4a shows a schematic illustration of a file system object with access control using a hash. Naturally, there is a need for different applications, hereafter also referred to as objects, to share data. FIG. 4a indicates persistent objects, namely object A, object F, and object G, whereby object A and object G are connected to object F, that is a trusted object. Moreover, object F has an access control list 40 with entries for object A only. The object F receives two read requests $r(n_1)$ and $r(n_2)$, both accompanied by the respective program-specific identifier H(A) and H(G), as it is indicated by the arrows labeled with H(A),$r(n_1)$ and H(G),$r(n_2)$ towards object F, respectively. The first request $r(n_1)$ comes from object A, which appears in object F's access control list 40. This is granted, whereby $d_1$ is returned by object F as indicated by the arrow labeled with H(F), $d_1$. The second request $r(n_2)$ comes from object G, which does not appear in object F's access control list 40. Thus, the second request $r(n_2)$ is denied, whereby a null is returned as indicated by the arrow labeled with H(F),Ø. Different access control lists could be kept for read and write privileges.

More complex objects F with rich method sets can use the same type of construction to implement desired access control policies in generality.

Figure 4B:
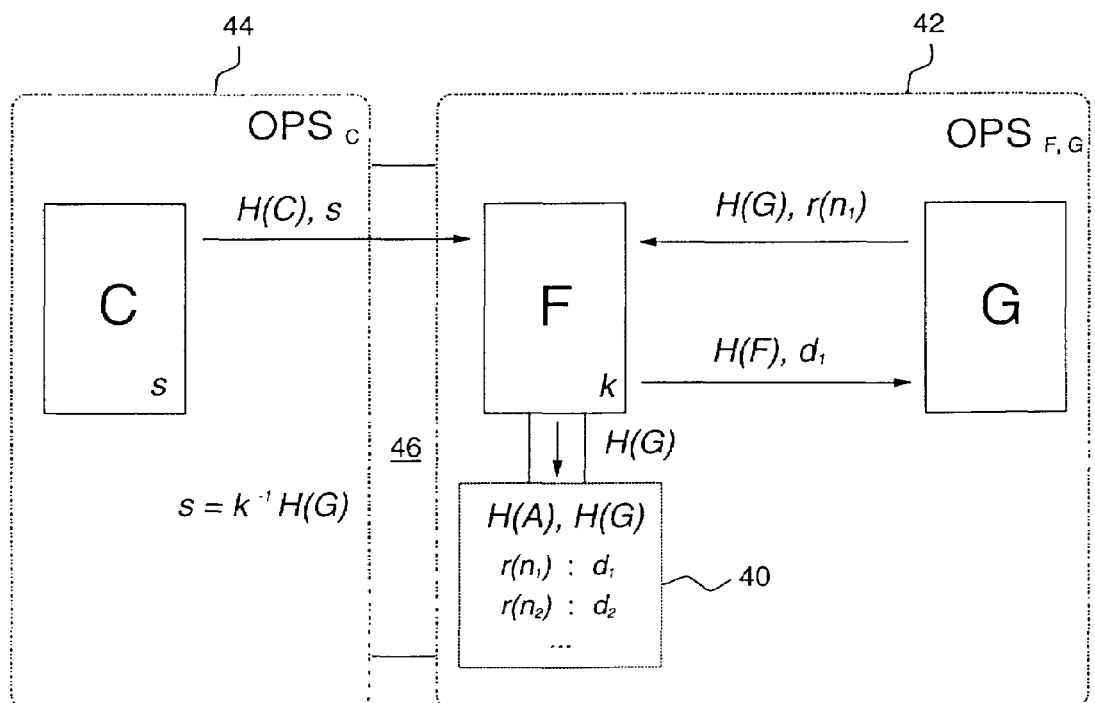
FIG. 4b shows the file system object of FIG. 4a for dynamic setup using digital signatures.

While FIG. 4a illustrates a static setup which does not allow to update the collection of trusted objects, FIG. 4b shows, based on the configuration of FIG. 4a, a file system object for dynamic setup.

The configuration of FIG. 4a can be updated using digital signatures. Therefore, object F has a public key K, as indicated in box F. Object F and object G are based on a first operating system 42, whilst a helper application, also referred to as object C, bases on a second operating system 44 which are connected by a channel 46 as it is known in the art. The first operating system 42 runs at a user whereas the second operating system 44 runs at a developer or a trusted entity. Object C is used to deliver $k^{-1}$ H(G), whereby $k^{-1}$ is a private key, to object F which verifies the validity of the signature and adds the program-specific identifier H(G) of the object G to its access control list 40. Access requests such as H(G),$r(n_1)$ from object G to object F will now be granted by object F, that returns H(F), $d_1$, as indicated by the respective arrows.

The construction depends upon the fact that the bearer of a digital signature does not need to be trusted so long as the signature is valid.

One can use this very fact to set up arbitrarily complicated trust relationships using a helper application.

Figure 5:
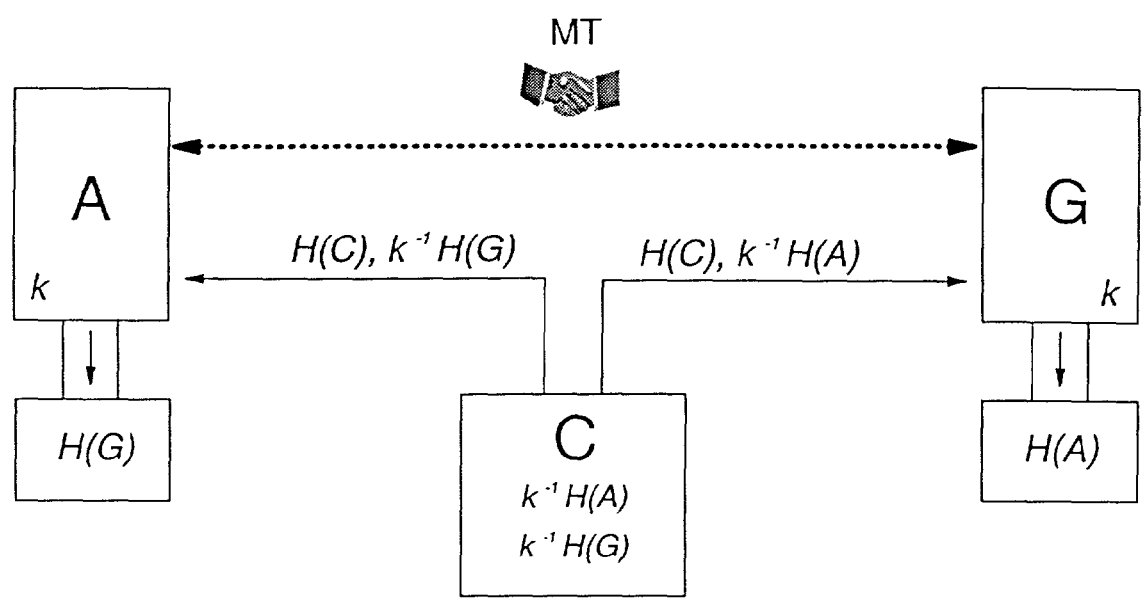
FIG. 5 shows a schematic illustration of an embodiment using a helper application to set up mutual trust relationships.

FIG. 5 shows a schematic illustration of an embodiment using a helper application, that here is object C again, to set up mutual trust (MT) relationship between object A and object G. Both objects A, G have the public key k and their own specific access control list, as indicated below the objects A, G, respectively. Using object C as the helper application, object C delivers $k^{-1}$ H(G) with its program-specific identifier H(C) to object A, which verifies the validity of the signature and adds the program-specific identifier H(G) to its access control list. On the other hand, object C delivers $k^{-1}$ H(A) with its program-specific identifier H(C) to object G, which verifies the validity of the signature and adds the program-specific identifier H(A) to its access control list. For further communication, object A can contact directly object G and vice versa, because now they know and trust each other, as indicated by the doted line between box A and G.

The scheme described with reference to FIG. 5 is not the same as traditional code signing which requires an intractable hierarchy of keys, certificates, developer registration, an so forth. The scheme does not use code signing to determine system privileges but is rather using signatures as credentials in a developer software coterie.

An example of where this might be useful is if a bank has several payment schemes which wish to share a common key. The individual components can be updated independently.

The following embodiment describes the design of a payment system using digital signatures using the access control mechanism based on cryptographic functions. This system is designed to be used through WAP without depending upon the security of WAP itself. Several steps are indicated in the following.

Global Setup

The initial setup for a bank is not too intrusive, since the bank need not contact the creators of the device, i.e. manufacturer of the PDA or computer.

1. The bank generates a public key/private key pair to sign individual users keys. This key pair is denoted as mk/mk$^{-1}$. This could be the banks master key or some derivative thereof.
2. The bank generates a public key/private key pair to identify membership in the banks suite of applications. This key pair is denoted as ak/ak$^{-1}$.
3. The bank writes a signing program S that comprises the public keys mk and ak.
4. Moreover, the bank writes a display program D, such as described with reference to FIG. 3. It accepts as a simple description of that which is to be signed, e.g. payee, amount, date, and description. The display program D then locks the physical display device and displays afterwards the necessary information to the user. If the user agrees, the display program D releases the lock and the terms will be passed to a signing program S, such as mentioned with reference to FIG. 3.
5. The bank computes ka$^{-1}$ H(D) and places this in a helper or registration program C, as shown with reference to FIG. 5.

Individual Setup

It is assumed that the bank wishes to generate and distribute keys for the user.

1. For each user U, the bank generates a key pair uk/uk$^{-1}$ and an application CU carrying the signed key pair mk$^{-1}$ (uk/uk$^{-1}$).
2. The bank provides to the user U the display program D, the signing program S, the registration program C, and the application CU. Only the application CU depends on the user U and is the only component requiring secrecy. The bank may wish to split the secret in some way.
3. Then, the user U installs the applications mentioned in the step above and the system automatically sets up four new security domains corresponding to the respective program-specific identifiers H(D), H(S), H(C), and H(CU).
4. The user U executes application CU which sends to the signing program S a message including mk$^{-1}$ (uk/uk$^{-1}$). The signing program S verifies that uk/uk$^{-1}$ is a valid user key using the key mk. The application CU then calls the registration program C and deletes itself, because it has no more purposes. The registration program C sends to the signing program S a message including ka$^{-1}$ H(D). Next, the signing program S uses ka to verify whether the display program D is a trusted application. Hence, the signing program S trusts the display program D.

When an application or program, as the WAP browser, wishes to generate a signature, it passes the text or document to the display program D for display and approval. If the user U approves the request is passed on to the signing program S which then sign it. The signing program S knows that the request reflects the users desires because it comes from the trusted display program D. The signature is eventually returned to the initial application.

If the bank wishes to generate a new application N, e.g. for home banking, trusted by the signing program S then they only generate a helper application C' carrying $ka^{-1}$ H(N).

Smartcard

If the bank wishes to use a smartcard to protect the private portion of the user's key pair, then the Individual Setup can be varied as follows.

1. For each user $U_s$, the bank generates a key pair uk/uk$^{-1}$ and put it on the smartcard. This key pair uk/uk$^{-1}$ can be signed with the bank's master key mk$^{-1}$ (uk/uk$^{-1}$).
2. The bank provides to the user $U_s$ at least the display program D and the registration program C.
3. Then, the user $U_s$ installs the applications mentioned in the step above and the system automatically sets up two new security domains corresponding to the respective program-specific identifiers H(D) and H(C).
4. The user $U_s$ executes the registration program C which sends the smartcard a message including ka$^{-1}$ H(D). The smartcard uses ka to verify that the display program D is a trusted application and hence forth trusts the display program D.

When the display program D sends a request to the smartcard, the request is delivered along with the program-specific identifier H(D) of the display program D.

Any disclosed embodiment may be combined with one or several of the other embodiments shown and/or described. This is also possible for one or more features of the embodiments.

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

What is claimed is:

1. A method for disclosing the identity of a message-originator program (D) to a message-receiver program (S), the method comprising:

sending from said message-originator program (D) to said message receiver program (S) a message comprising a program-specific identifier (H(D)), which has been provided for said message-originator program (D) by means of an automatic operation of applying a hash function (H) to said message originator program in a trusted computing base (TCB) in which said trusted computing base applies said hash function to said message originator program in response to a request from said message originator program, the result of which hash function is said program-specific identifier, said program-specific identifier (H(D)) being verifiable at said message-receiver program (S) whether it is known to said message-receiver program (S).

2. A method for verifying the identity of a message-originator program (D) by message-receiver program (S), the method comprising the steps of:

providing a program-specific identifier (H(D)) for said message-originator program (D) by means of an automatic operation of applying a hash function (H) to said message originator program in a trusted computing base (TCB), in which said trusted computing base applies said hash function to said message originator program in response to a request from said message originator program, the result of which hash function is said program-specific identifier;

sending from said message-originator program (D) to said message-receiver program (S) a message comprising said program-specific identifier (H(D)), receiving at said message-receiving program (S) said message; and verifying whether said received program-specific identifier (H(D)) is known to said message-receiver program (S).

3. Method according to claim 2, wherein the message-receiver program afterwards becomes a response message-originator program and sends a response message to the message-originator program comprising:

a response-program-specific identifier (H(S)), which has been provided for said response-message originator program by means of the trusted computing base (TCB); and an acknowledgment of the program-specific identifier (H(D)) has been verified as being known.

4. Method according to claim 2, wherein the message further comprises an additional program-specific identifier (H(G)) that is signed by use of a private cryptographic key ($k^{-1}$) acceptable to said message receiver program to establish a membership of an additional program in a trust relationship, in which said private cryptographic key is supplied by a helper program that is known to said message-receiver program and knows said message originator program; and said helper program receives an additional private key and an additional program specific identifier from said additional program;

said helper program verifies that said additional program is known to it; and said helper program sends said additional private key and additional program specific identifier to said message receiver program;

said message receiver program adds said additional private key and additional program specific identifier to a stored list of known program specific identifiers, whereby said additional program is added to said trust relationship.

5. Method according to claim 2, wherein the message-originator program (D) and the message-receiver program (S) are executed on different systems and are connectable via a network, each having its trusted computing base (TCB) for providing program-specific cryptographic identifiers.

6. A computer program comprising program code means for performing the steps of claim 2, when said program is run on a computer.

7. A computer program product comprising program code means stored on a computer readable medium for performing the method of claim 2, when said program product is run on a computer.

8. A method according to claim 4, in which said helper program is invoked after said message originator program has been rejected by said message receiver program.

9. A method according to claim 4, in which said helper program is invoked to perform a computation function.

10. A method according to claim 8, in which said helper program is invoked said message originator program without human intervention.

11. A method according to claim 9, in which said helper program is invoked said message originator program without human intervention.

12. An apparatus for verifying the identity of a message-originator program (D) by a message-receiver program (S) on a computer, the apparatus comprising:

computing means;

a receive module for receiving from said message-originator program (D) a message comprising a program-specific identifier (H(D)), which has been provided for said message-originator program (D) by means of an automatic operation of applying a hash function (H) to said message originator program in a trusted computing base (TCB), in which said trusted computing base applies said hash function to said message originator program in response to a request from said message originator program, the result of which hash function is said program-specific identifier, and a verifier-module that verifies whether said program-specific identifier (H(D)) is known to said message-receiver program (S).

* * * * *